US011630754B1

(12) United States Patent
Chen et al.

(10) Patent No.: US 11,630,754 B1
(45) Date of Patent: Apr. 18, 2023

(54) IDENTIFICATION AND REMEDIATION OF MEMORY LEAKS USING RULE-BASED DETECTION OF ANOMALOUS MEMORY USAGE PATTERNS

(71) Applicant: Dell Products L.P., Round Rock, TX (US)

(72) Inventors: Chi Chen, Chengdu (CN); Hailan Dong, Chengdu (CN); Huijuan Fan, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/526,169

(22) Filed: Nov. 15, 2021

(30) Foreign Application Priority Data

Oct. 29, 2021 (CN) .......................... 202111279423.8

(51) Int. Cl.
    *G06F 11/00*     (2006.01)
    *G06F 11/34*     (2006.01)
    (Continued)

(52) U.S. Cl.
    CPC ........ *G06F 11/3466* (2013.01); *G06F 9/5016* (2013.01); *G06F 9/5022* (2013.01);
    (Continued)

(58) Field of Classification Search
    CPC .............. G06F 11/0703; G06F 11/073; G06F 11/0751; G06F 11/0754; G06F 11/076;
    (Continued)

(56) References Cited

U.S. PATENT DOCUMENTS

| 7,779,223 | B2 * | 8/2010 | Dickenson | ............ | G06F 11/362 |
|---|---|---|---|---|---|
| | | | | | 711/170 |
| 8,359,450 | B2 * | 1/2013 | Crosby | ................. | G06F 11/366 |
| | | | | | 711/170 |

(Continued)

OTHER PUBLICATIONS

Jindal, Anshul, Paul Staab, Pooja Kulkarni, Jorge Cardoso, Michael Gerndt, and Vladimir Podolskiy. "Memory Leak Detection Algorithms in the Cloud-based Infrastructure." arXiv preprint arXiv:2106.08938 (2021). (Year: 2021).*

(Continued)

*Primary Examiner* — Anthony J Amoroso
(74) *Attorney, Agent, or Firm* — Ryan, Mason & Lewis, LLP

(57) ABSTRACT

An apparatus comprises a processing device configured to initiate, in response to a designated event, monitoring of memory allocation and de-allocation operations associated with a given application, to maintain a memory allocation operation data structure comprising entries each corresponding to a memory allocation operation not having an associated memory de-allocation operation, and to determine whether memory usage of the given application corresponds to any of a set of anomalous memory usage pattern rules based on the memory allocation operation data structure. The processing device is also configured to identify the given application as being a cause of a memory leak responsive to determining that the memory usage of the given application corresponds to one or more of the anomalous memory usage pattern rules, and to perform remedial action for preventing or resolving the memory leak responsive to identifying the given application as being the cause of the memory leak.

20 Claims, 6 Drawing Sheets

(51) Int. Cl.
*G06F 11/30* (2006.01)
*G06F 9/50* (2006.01)
*G06F 11/07* (2006.01)

(52) U.S. Cl.
CPC ........ *G06F 11/076* (2013.01); *G06F 11/0772* (2013.01); *G06F 11/0793* (2013.01); *G06F 11/3037* (2013.01); *G06F 11/3409* (2013.01)

(58) Field of Classification Search
CPC ............. G06F 11/0772; G06F 11/0778; G06F 11/0781; G06F 11/079; G06F 11/0793; G06F 11/3037; G06F 11/3409; G06F 11/3452; G06F 11/3466; G06F 11/36; G06F 11/3604; G06F 11/3612; G06F 11/362; G06F 11/3636; G06F 11/3644; G06F 12/0238; G06F 12/0253; G06F 12/0269; G06F 12/0276; G06F 9/50; G06F 9/5011; G06F 9/5016; G06F 9/5022
See application file for complete search history.

(56) References Cited

U.S. PATENT DOCUMENTS

| | | | | |
|---|---|---|---|---|
| 8,473,789 | B2* | 6/2013 | Callaghan | G06F 11/366 714/47.1 |
| 10,289,347 | B2* | 5/2019 | Mangione-Tran | G06F 3/0608 |
| 11,112,993 | B2* | 9/2021 | Ilangovan | G06F 3/0673 |
| 11,442,832 | B2* | 9/2022 | Murray | G06F 12/10 |
| 2005/0091646 | A1* | 4/2005 | Chilimbi | G06F 11/3636 717/130 |
| 2008/0127212 | A1* | 5/2008 | Nakamizo | G06F 12/0253 719/315 |
| 2011/0145536 | A1* | 6/2011 | Zachmann | G06F 11/0751 711/170 |
| 2015/0163088 | A1* | 6/2015 | Anschutz | G06F 11/3003 709/224 |
| 2021/0026721 | A1* | 1/2021 | Wang | G06F 11/0751 |
| 2021/0334186 | A1* | 10/2021 | Chen | H04L 41/145 |
| 2021/0397536 | A1* | 12/2021 | Halwe | G06F 11/3037 |

OTHER PUBLICATIONS

J. Clause and A. Orso, "LEAKPOINT: pinpointing the causes of memory leaks," 2010 ACM/IEEE 32nd International Conference on Software Engineering, 2010, pp. 515-524, doi: 10.1145/1806799.1806874. (Year: 2010).*

Q. Gao et al., "Safe Memory-Leak Fixing for C Programs," 2015 IEEE/ACM 37th IEEE International Conference on Software Engineering, 2015, pp. 459-470, doi: 10.1109/ICSE.2015.64. (Year: 2015).*

Z. Xu, J. Zhang and Z. Xu, "Memory Leak Detection Based on Memory State Transition Graph," 2011 18th Asia-Pacific Software Engineering Conference, 2011, pp. 33-40, doi: 10.1109/APSEC.2011.22. (Year: 2011).*

L. M. Houston, "An Autocorrelation Term Method for Curve Fitting," ISRN Applied Mathematics, vol. 2013, No. 346230, Jul. 8, 2013, 4 pages.

D. Eberly, "Least Squares Fitting of Data," Geometric Tools, LLC, http://www.geometrictools.com/, Feb. 9, 2008, 10 pages.

R. Prabhu, "Dynamic Memory Allocation in C using malloc(), calloc(), free() and realloc()," https://www.geeksforgeeks.org/dynamic-memory-allocation-in-c-using-malloc-calloc-free-and-realloc/, Jul. 10, 2021, 15 pages.

M. D. Sacchi et al., "Interpolation and Extrapolation Using a High-Resolution Discrete Fourier Transform," IEEE Transactions on Signal Processing, vol. 46, No. 1, Jan. 1998, pp. 31-38.

* cited by examiner

```
static void* (* __malloc_hook) (size_t,const void *) = 0;
static void (* __free_hook)(void *,const void *) = 0;

static void my_init_hook(void)
{
        __malloc_hook = my_malloc_hook;
        __free_hook = my_free_hook;
}

Char * malloc (size_t size, const void *)
{
        char* p;
        ...
        if(__malloc_hook) * __malloc_hook (char*p);
}

Char * free (void * prt, const void *)
{
        if(__free_hook) * __free_hook (void *ptr);
        ...
} static int _malloc_hook (char*prt)
{
        #check if the task id in the monitor list
        if(!getCallerIDinlist) return 0;
        #Add the memory entry in the memory malloc list
        #To avoid race condition, we may need use mutex or interrupt lock to protect the list.
        Addtolist(p);
        return 1;
} static int _free_hook (void * prt)
{
        #Remove the memory entry if it is in the memory malloc list
        if (Isinlist(prt))
                Removefromlist(prt);
        Return 1;
}
```

FIG. 3

IDENTIFICATION AND REMEDIATION OF MEMORY LEAKS USING RULE-BASED DETECTION OF ANOMALOUS MEMORY USAGE PATTERNS

RELATED APPLICATION

The present application claims priority to Chinese Patent Application No. 202111279423.8, filed on Oct. 29, 2021 and entitled "Identification and Remediation of Memory Leaks," which is incorporated by reference herein in its entirety.

FIELD

The field relates generally to information processing, and more particularly to techniques for managing information processing systems.

BACKGROUND

Memory leaks occur when applications incorrectly manage memory allocation. For example, a memory leak may occur when an application allocates memory from a pool of available memory resources, but does not later de-allocate or free the allocated memory back to the pool of available memory resources. Memory leaks can lead to significant negative impacts on system performance, including causing slowdowns and potentially crashes or other system failures. Diagnosing memory leaks, however, is a challenging and time-consuming process which often requires a programmer or developer to perform a detailed manual review of application source code.

SUMMARY

Illustrative embodiments of the present disclosure provide techniques for identification and remediation of memory leaks using rule-based detection of anomalous memory usage patterns.

In one embodiment, an apparatus comprises at least one processing device comprising a processor coupled to a memory. The at least one processing device is configured to perform the steps of initiating, in response to a designated event, monitoring of memory allocation and de-allocation operations associated with at least a given one of a set of applications, maintaining a memory allocation operation data structure comprising one or more entries, each of the one or more entries corresponding to a monitored memory allocation operation associated with the given application not having an associated memory de-allocation operation, and determining whether memory usage of the given application corresponds to any of a set of anomalous memory usage pattern rules based at least in part on the one or more entries of the memory allocation operation data structure for the given application. The at least one processing device is also configured to perform the steps of identifying the given application as having at least a designated threshold likelihood of being a cause of at least one memory leak responsive to determining that the memory usage of the given application corresponds to one or more of the set of anomalous memory usage pattern rules, and performing one or more remedial actions for at least one of preventing and resolving the at least one memory leak responsive to identifying the given application as having at least the designated threshold likelihood of being the cause of the at least one memory leak.

These and other illustrative embodiments include, without limitation, methods, apparatus, networks, systems and processor-readable storage media.

BRIEF DESCRIPTION OF THE DRAWINGS

FIG. 3 shows pseudocode for implementing memory allocation and de-allocation operation hooks in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
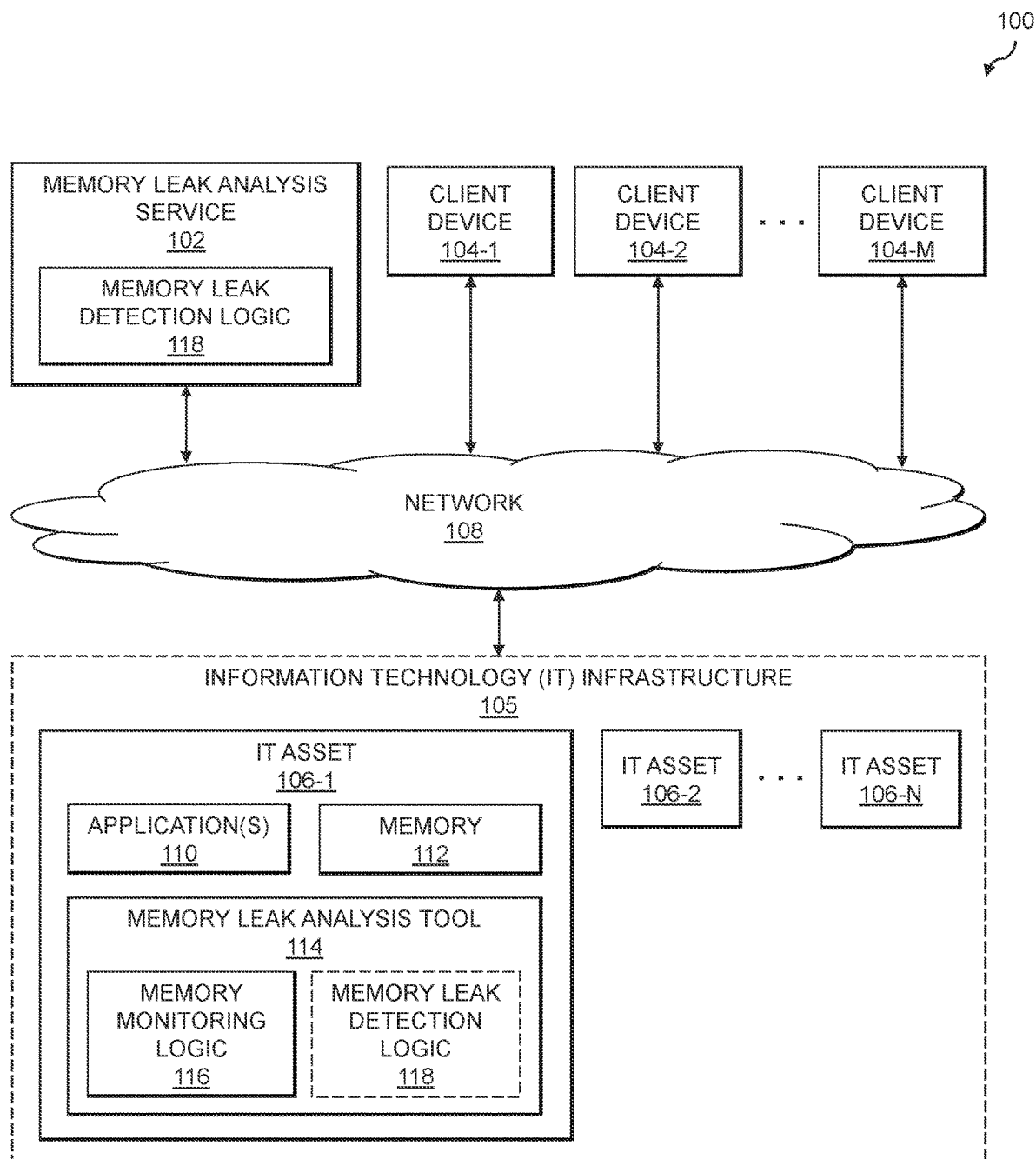
FIG. 1 is a block diagram of an information processing system configured for identification and remediation of memory leaks using rule-based detection of anomalous memory usage patterns in an illustrative embodiment.

FIG. 1 shows an information processing system 100 configured in accordance with an illustrative embodiment. The information processing system 100 is assumed to be built on at least one processing platform and provides functionality for identification and remediation of memory leaks using rule-based detection of anomalous memory usage patterns. The information processing system 100 includes a memory leak analysis service 102 and a set of client devices 104-1, 104-2, . . . 104-M (collectively, client devices 104) that are coupled to an information technology (IT) infrastructure 105 comprising a set of IT assets 106-1, 106-2, . . . 106-N (collectively, IT assets 106) via network 108. The IT assets 106 may include, by way of example, physical and virtual computing resources. Physical computing resources may include physical hardware such as servers, storage systems, networking equipment, Internet of Things (IoT) devices, health monitoring devices or other types of wearable devices, satellite devices, other types of processing and computing devices, etc. Virtual computing resources may include virtual machines (VMs), software containers (also referred to herein as containers), etc.

The client devices 104 are assumed to access or otherwise utilize the IT assets 106 of the IT infrastructure 105. The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

In some embodiments, the IT infrastructure 105 is operated by an enterprise, and the client devices 104 are operated by users of the enterprise. The IT infrastructure 105 may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may host at least a portion of the memory leak analysis service 102 and/or the client devices 104. A given enterprise system may host IT assets 106 that are associated with multiple enterprises (e.g., two or more different businesses, organizations or other entities). In some embodiments, the IT infrastructure 105 may comprise an enterprise data center such as a colocation data center which hosts the IT assets 106 that are accessed by end-users of the client devices 104.

The network 108 coupling the memory leak analysis service 102, the client devices 104 and the IT infrastructure 105 is assumed to comprise a global computer network such as the Internet, although other types of networks can be used, including a wide area network (WAN), a local area network (LAN), a satellite network, a telephone or cable network, a cellular network, a wireless network such as a WiFi or WiMAX network, or various portions or combinations of these and other types of networks.

Although not explicitly shown in FIG. 1, one or more input-output devices such as keyboards, displays or other types of input-output devices may be used to support one or more user interfaces to the memory leak analysis service 102, the client devices 104 and the IT infrastructure 105, as well as to support communication between the memory leak analysis service 102, the client devices 104, the IT infrastructure 105 and other related systems and devices not explicitly shown.

In the FIG. 1 embodiment, the IT assets 106 operating in the IT infrastructure 105 are assumed to run applications which utilize associated memories. As used herein the term "application" is intended to be broadly construed to include applications, jobs, tasks, processes, microservices and other types of services, etc. which utilize memory (e.g., which issue calls to allocate and de-allocate memory and thus may be responsible for memory leak conditions). As shown in FIG. 1, the IT asset 106-1 runs a set of applications 110 which utilize memory 112. The memory 112 may comprise physical and/or virtual memory of the IT asset 106-1.

The IT asset 106-1 further implements a memory leak analysis tool 114 which is configured to implement memory monitoring logic 116. The memory leak analysis tool 114 may also implement memory leak detection logic 118, though in some embodiments the memory leak detection logic 118 may run at least partially external to the memory leak analysis tool 114, such as on a memory leak analysis service 102 that operates outside of the IT asset 106-1 and IT infrastructure 105. For example, the memory leak detection logic 118 running on the memory leak analysis service 102 may collect memory monitoring data from multiple ones of the IT assets 106, in order to determine whether a given application is the cause of memory leaks on multiple different ones of the IT assets 106. This may be used to confirm that the given application is the cause of suspected memory leaks (rather than some other application or issue that is particular to one or more of the IT assets 106). This can also help in performing root cause analysis (e.g., analyzing why the given application causes memory leaks on some of the IT assets 106 but not others). Although not explicitly shown in FIG. 1, other ones of the IT assets 106-2 through 106-N may run an associated set of applications which utilize one or more associated memories and which also implement instances of the memory leak analysis tool 114. In some embodiments, one or more of the client devices 104 also implement instances of the memory leak analysis tool 114.

The memory monitoring logic 116 is configured to track when different ones of the applications 110 perform designated operations, such as memory allocation and de-allocation operations for the memory 112. The memory monitoring logic 116 may be configured to do so for all of the applications 110 running on the IT asset 106-1, or for a subset of the applications 110 running on the IT asset 106-1 (e.g., those applications of interest which are suspected as being the cause of memory leaks). The identification of which applications 110 that the memory monitoring logic 116 will monitor may be specified by end-users or a system administrator (e.g., operating one or more of the client devices 104). In some embodiments, the memory monitoring logic 116 maintains a list, table or other data structure, referred to as a tracked memory allocation operation list, having information entries indicating when tracked ones of the applications 110 perform memory allocation operations involving the memory 112. Such information entries may be removed from the tracked memory allocation operation list when corresponding memory de-allocation operations are performed. Each information entry may include various parameters, such as an identifier of the application 110 that is the source of the memory allocation request, a time of the memory allocation request, a size of the memory allocation request, etc.

In some embodiments, the memory monitoring logic 116 runs for some designated amount of time (e.g., which may be user-defined, based on analyzing overall performance of the IT asset 106-1 such as running only when system performance is degraded, in response to users requests to initialize and de-initialize memory monitoring, etc.). The memory leak detection logic 118, whether operating in the memory leak analysis tool 114 or the memory leak analysis service 102, may analyze the tracked memory allocation operation list produced by the memory monitoring logic 116 to determine or identify suspect memory leaks. To do so, the memory leak detection logic 118 may determine the frequencies of the information entries in the tracked memory allocation operation list (e.g., for different ones of the tracked applications 110). As noted above, the memory leak detection logic 118 may analyze memory monitoring data (e.g., multiple tracked memory allocation operation lists)

from multiple ones of the IT assets 106 in order to determine or identify suspect memory leaks.

On determining or identifying suspect memory leaks, the memory leak detection logic 118 may initiate various remedial actions. Such remedial actions may include initiating further review (e.g., whether automated or by an end-user or system administrator) to determine whether a suspected memory leak is an actual memory leak. The remedial actions may also or alternatively include killing, terminating, ending, or otherwise stopping or ceasing execution of ones of the applications 110 that are identified as the source of a suspected or actual memory leak. The remedial actions may further or alternatively include allocating additional memory resources (e.g., physical and/or virtual memory resources) to IT assets 106 having suspected or actual memory leaks, generating notifications for delivery to one or more designated end-users, system administrators, etc. (e.g., which operate the client devices 104) indicating that particular ones of the applications 110 are the sources of suspected or actual memory leaks, and including interface features that allow the recipients of the notifications to take other remedial actions as desired.

In some embodiments, memory monitoring information (e.g., tracked memory allocation operation lists) and memory leak information may be stored in a database or other data store. The database or other data store may be implemented using one or more of storage systems that are part of or otherwise associated with the memory leak analysis service 102 and/or one or more of the IT assets 106 of the IT infrastructure 105. The storage system implementing the databases or other data stores in which the access authorization information is stored may comprise a scale-out all-flash content addressable storage array or other type of storage array. The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the IT asset 106-1 and the memory leak analysis service 102, the memory leak analysis tool 114, the memory monitoring logic 116 and the memory leak detection logic 118 in the FIG. 1 embodiment, the memory leak analysis tool 114, memory monitoring logic 116 and/or memory leak detection logic 118 may be implemented at least partially external to such elements, for example, as part of stand-alone servers, sets of servers or other types of systems coupled via one or more networks to the memory leak analysis service 102 and the IT assets 106. Further, as noted above, multiple instances of the memory leak analysis tool 114 may be implemented (e.g., on multiple ones of the IT assets 106, on the client devices 104, etc.).

The memory leak analysis service 102, the client devices 104, and the IT infrastructure 105 in the FIG. 1 embodiment are assumed to be implemented using at least one processing device. Each such processing device generally comprises at least one processor and an associated memory, and implements at least a portion of the functionality of the various logic described herein.

It is to be appreciated that the particular arrangement of the memory leak analysis service 102, the client devices 104, and the IT infrastructure 105 illustrated in the FIG. 1 embodiment is presented by way of example only, and alternative arrangements can be used in other embodiments. For example, in some cases the memory leak analysis service 102, the client devices 104, and/or the IT infrastructure 105 may be co-located. At least portions of the memory monitoring logic 116 and the memory leak detection logic 118 may be implemented at least in part in the form of software that is stored in memory and executed by a processor.

It is to be understood that the particular set of elements shown in FIG. 1 for identification and remediation of memory leaks using rule-based detection of anomalous memory usage patterns is presented by way of illustrative example only, and in other embodiments additional or alternative elements may be used. Thus, another embodiment may include additional or alternative systems, devices and other network entities, as well as different arrangements of modules and other components.

The memory leak analysis service 102, the client devices 104, the IT infrastructure 105 and other portions of the system 100, as described above and in further detail below, may be part of cloud infrastructure.

The memory leak analysis service 102, the client devices 104, the IT infrastructure 105 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The memory leak analysis service 102, the client devices 104, the IT infrastructure 105, or components thereof, may be implemented on respective distinct processing platforms, although numerous other arrangements are possible. For example, in some embodiments at least portions of the memory leak analysis service 102 and the IT infrastructure 105 are implemented on the same processing platform. Further, one or more of the client devices 104 can be implemented at least in part within at least one processing platform that implements at least a portion of the memory leak analysis service 102 and the IT infrastructure 105.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the memory leak analysis service 102, the client devices 104, and the IT infrastructure 105, or portions or components thereof, to reside in different data centers. Numerous other distributed implementations are possible.

Additional examples of processing platforms utilized to implement the memory leak analysis service 102, the client devices 104, the IT infrastructure 105 and other components of the system 100 in illustrative embodiments will be described in more detail below in conjunction with FIGS. 5 and 6.

It is to be appreciated that these and other features of illustrative embodiments are presented by way of example only, and should not be construed as limiting in any way.

An exemplary process for identification and remediation of memory leaks using rule-based detection of anomalous memory usage patterns will now be described in more detail with reference to the flow diagram of FIG. 2. It is to be understood that this particular process is only an example, and that additional or alternative processes for identification and remediation of memory leaks using rule-based detection of anomalous memory usage patterns may be used in other embodiments.

In this embodiment, the process includes steps 200 through 208. These steps are assumed to be performed utilizing the memory monitoring logic 116 and the memory leak detection logic 118. The process begins with step 200, initiating, in response to a designated event, monitoring of memory allocation and de-allocation operations associated with at least a given one of a set of applications. The designated event may comprise at least one of: receiving a request to determine whether the given application is a cause of at least one memory leak; determining that a system on which the given application runs is experiencing at least one memory leak; and determining that a system on which the given application runs is experiencing degraded performance, the degraded performance corresponding to one or more performance metrics being below one or more designated performance metric thresholds for at least a designated threshold period of time. Monitoring memory allocation and de-allocation operations associated with the given application may comprise activating application hooks in memory allocation and de-allocation functions exposed by a system on which the given application runs.

A memory allocation operation data structure is maintained in step 202. The memory allocation operation data structure comprises one or more entries, with each of the one or more entries corresponding to a monitored memory allocation operation associated with the given application not having an associated memory de-allocation operation. Step 202 may include creating an entry in the memory allocation operation data structure in response to each detected memory allocation operation associated with the given application, and removing an entry in the memory allocation operation data structure in response to each detected memory de-allocation operation. It should be appreciated that, in some embodiments, the memory allocation operation data structure may be generated or otherwise created by a different entity than the entity that performs the FIG. 2 process. As discussed above, for example, in some cases memory leak detection logic 118 can be executed on a different entity (e.g., the memory leak analysis service 102) relative to the memory leak analysis tool 114 executing the memory monitoring logic 116 (e.g., which runs on IT asset 106-1). Thus, "maintaining" the memory allocation operation data structure may include populating or otherwise maintaining an existing data structure that is at least partially created or generated by another entity.

A given one of the entries in the memory allocation operation data structure may comprise an identifier of the given application, a time of a given memory allocation request by the given application, an identification of a given portion of memory of a system on which the given application runs that is allocated to the given application in response to the given memory allocation request, and a size of the given portion of the memory of the system on which the given application runs that is allocated to the given application in response to the given memory allocation request. The given memory allocation request may comprise at least one of: a call to a memory allocation function that dynamically assigns a block of memory with a specified size; a call to a contiguous memory allocation function that dynamically assign two or more blocks of memory with specified sizes; and a call to a memory re-allocation function that dynamically changes the allocation of at least one previously-assigned block of memory.

Figure 2:
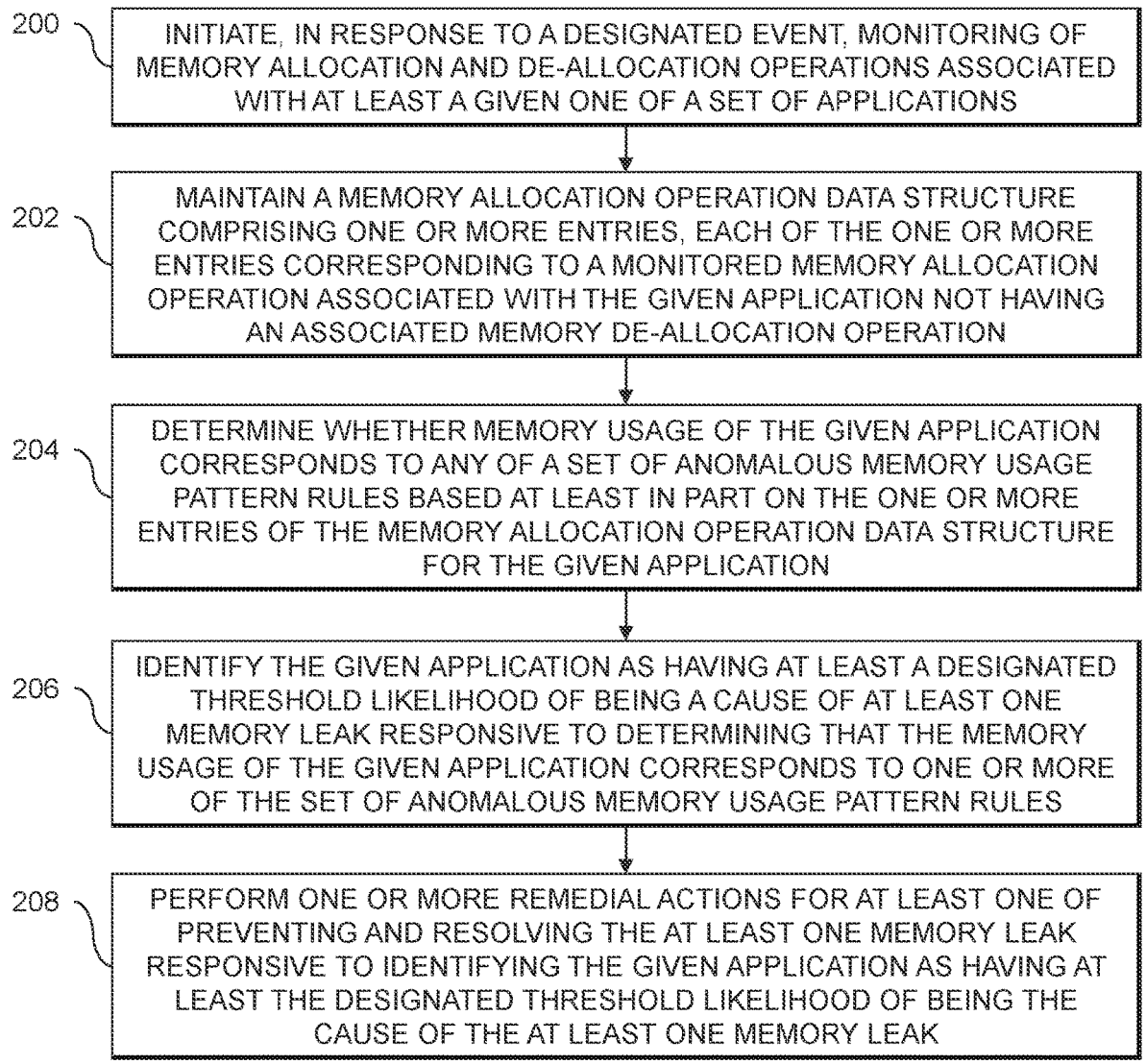
FIG. 2 is a flow diagram of an exemplary process for identification and remediation of memory leaks using rule-based detection of anomalous memory usage patterns in an illustrative embodiment.

The FIG. 2 process continues with step 204, determining whether memory usage of the given application corresponds to any of a set of anomalous memory usage pattern rules based at least in part on the one or more entries of the memory allocation operation data structure for the given application. Step 204 may be performed in response to an additional designated event, where the additional designated event comprises at least one of: receiving a request to cease monitoring of the memory allocation and de-allocation operations associated with the given application; determining that the memory allocation and de-allocation operations associated with the given application have been monitored for at least a designated threshold period of time; determining that a system on which the given application runs is no longer experiencing at least one memory leak; and determining that the system on which the given application runs is no longer experiencing degraded performance, wherein determining that the system is no longer experiencing degraded performance is based at least in part on one or more performance metrics being at or above one or more designated performance metric thresholds for at least a designated threshold period of time.

The set of anomalous memory usage pattern rules may comprise a first memory usage pattern where memory usage of the given application increases over a first designated period of time, and a second memory usage pattern where memory usage of the given application increases over a second designated period of time while application load of the given application increase less than a designated threshold amount. The first designated period of time may be longer than the second designated period of time. The set of anomalous memory usage pattern rules may also or alternatively comprise a third memory usage pattern where available memory of a system on which the given application runs is below a first designated available memory threshold, and a fourth memory usage pattern where the available memory of the system on which the given application runs is below a second designated available memory threshold and a rate of increase in memory usage of the system on which the given application runs is above a designated memory usage increase rate threshold, wherein the second designated available memory threshold is lower than the first designated available memory threshold.

In step 206, the given application is identified as having at least a designated threshold likelihood of being a cause of at least one memory leak responsive to determining that the memory usage of the given application corresponds to one or more of the set of anomalous memory usage pattern rules. One or more remedial actions for at least one of preventing and resolving the at least one memory leak are performed in step 208 responsive to identifying the given application as having at least the designated threshold likelihood of being the cause of the at least one memory leak. The one or more remedial actions may comprise at least one of: stopping execution of the given application; modifying allocation of at least one of physical and virtual memory resources to the system on which the given application runs; initiating performance of root cause analysis for the at least one memory leak; and generating and delivering a notification to one or more IT administrators responsible for managing the system on which the given application runs.

Illustrative embodiments provide tools configured for analysis of memory leaks using rule-based anomaly detection. Such memory leak analysis tools are advantageously lightweight, and can be enabled and disabled on-the-fly. The memory leak analysis tools can also be enabled at a small granularity, such that memory leaks can be detected on an individual application level, also referred to as an individual task level. The memory leak analysis tools can also be run both in a system test environment and a customer or production environment, as the memory leak analysis tools are sufficiently lightweight that performance will not be impacted. Once memory leaks are identified, root cause analysis can be performed such that future memory leaks can be avoided thereby improving device performance and overall quality of user experience. Conventional approaches for memory leak detection require heavyweight tools that significantly affect system performance. Such conventional tools can also only be enabled at a system level (e.g., they cannot be enabled and disabled at the application level) and thus are not suitable for system test and customer or production environments.

Programming languages with explicit memory management require a programmer to manually de-allocate memory blocks that are no longer needed by an application. Memory leaks are a common problem in the software code written in such languages. Memory leaks are particularly serious in long-running applications, where a memory leak in a given application slowly consumes available memory of the system on which the given applications runs, causing performance degradation and eventually crashing the system. Further, memory leaks are among the hardest bugs to detect since memory leaks typically have few visible symptoms other than the slow and steady increase in memory consumption. Memory leaks remain an important problem in the development of many widely-used applications.

Memory leak issues can have a large and significant negative impact on product quality, and memory leak issues are also very hard and costly to test, reproduce, and perform root cause analysis for. Conventional tools have significant drawbacks, in that they are heavyweight and cannot be enabled in release versions of applications (especially when running at a customer or production site), as they will degrade system performance. Further, use of such conventional heavyweight tools are problematic in system test environments as well, due to their affect on system performance which can skew the results of testing. Conventional tools have limited code and use case scenario coverage.

The memory leak analysis tools described herein are lightweight, and can be enabled and disabled on-the-fly and can also be enabled and disabled in a small granularity (e.g., at an individual application level). Rule-based anomaly detection is used for identifying or detecting memory leaks, and enables memory leak checks at the scope of individual applications which may cause memory leaks. The rule-based anomaly detection memory leak analysis tools, on detecting a potential memory leak, can collect and provide information relating to potential or suspected memory leaks (e.g., call traces, task identifiers (IDs), etc.). The rule-based anomaly detection memory leak analysis tools are suitable for use in system test environments as well as customer or production environments, as system performance will not be significantly impacted. Thus, use of the rule-based anomaly detection memory leak analysis tools can improve product quality greatly.

Memory leaks degrade system performance by reducing the amount of memory available for each application running on a system. Memory leaks also increase the amount of thrashing, and eventually may cause system failure or slowdown. Therefore, it is important to detect or identify potential memory leak issues before they lead to system failure or disaster.

Anomaly detection is the process of identifying unexpected items or events in datasets, which differ from what is considered "normal" data. Rule-based systems are designed by defining specific rules that describe anomalies, usually by assigning various thresholds and limits to various parameters or metrics. Illustrative embodiments provide rule-based anomaly detection for memory leak analysis that can operate at an individual application level, to detect if there is a memory leak in a system running that application. Various different rules may be designed, and for different use cases an expert may define custom rules for use in an associated real-world scenario. In some embodiments, the following rules are defined for detecting anomalies representing memory leaks: an application's memory usage increases constantly or continually over some designated period of time; an application's memory usage increases, but the application load is not increasing over some designated period of time; and a system's memory is running out. In order to quantify thresholds and limits for such rules, the history of memory usage by a system (and potentially the individual applications running thereon) are analyzed.

Data patterns may be detected from historical memory usage for one or more systems, and/or for one or more applications running on the one or more systems. Statistical analysis or data fitting models may be used to determine trend functions for memory usage over time (e.g., the trend functions may be for overall memory usage by a system, for individual applications running on a system, combinations thereof, etc.). Various statistical analysis and data fitting models may be used, including but not limited to a least squares method, autocorrelation, discrete Fourier transform, etc. Suppose that an application's memory usage at a time point t, denoted $Mem_{application\ i,t}$, is calculated according to the following equation:

$$Mem_{application\ i,t} = TrendFunc1(application\ i,t)$$

TrendFunc1 denotes a statistical analysis or data fitting model, and may include but is not limited to a least squares algorithm, an autocorrelation algorithm, a discrete Fourier transform algorithm, combinations thereof, etc. Further suppose that memory usage status is evaluated over N periodic sampling time points $\{t_1, t_2, \ldots, t_N\}$. In a future period, the application i's average memory usage rate of increase, denoted $R_{application\ i}$, is determined according to the following equation:

$$R_{application\ i} = \frac{1}{N-1} \cdot \sum_{n=1}^{N-1} \frac{Mem_{application\ i,t_{n+1}} - Mem_{application\ i,t_n}}{Mem_{application\ i,t_n}}$$

In the equation above, n denotes the starting evaluation period used in determining the application i's average memory usage rate of increase.

When $R_{application\ i} \geq \theta$, it means that the application i's average memory usage rate of increase exceeds an acceptable long-term threshold θ. If the sample period is of sufficient duration (e.g., as defined by some designated threshold duration), this corresponds to the application i's memory usage increasing "constantly" or continually over the designated time period.

When $R_{application\ i} \geq \varphi$ and application i's load is stable (e.g., the load does not change more than some designated threshold load change), it means that the application i's average memory usage rate of increase exceeds an acceptable short-time threshold cp. This corresponds to the application i's memory usage increasing while the application i's load does not increase over some designated period of time. It should be noted that, in this case, the sample period required may be shorter in duration than that used when comparing against the acceptable long-term threshold θ.

Suppose that the system's overall memory usage at time point t, denoted $Mem_{system,t}$, is calculated according to the following equation:

$$Mem_{system,t} = TrendFunc2(system, t)$$

TrendFunc2 denotes a statistical analysis or data fitting model, and may include but is not limited to a least squares algorithm, an autocorrelation algorithm, a discrete Fourier transform algorithm, combinations thereof, etc. Further suppose that the system's memory status is evaluated over M periodic sampling time points $\{t_1, t_2, \ldots, t_M\}$. In a future period, the system's average memory usage rate of increase $R_{system}$ is determined according to the following equation:

$$R_{system} = \frac{1}{M-1} \cdot \sum_{m=1}^{M-1} \frac{Mem_{system,t_{m+1}} - Mem_{system,t_m}}{Mem_{system,t_m}}$$

In the equation above, m denotes the starting evaluation period used in determining the system's average memory usage rate of increase. To determine if the system's memory is running out, various rules may be used. If $Mem_{system,now} > 95\%$, this corresponds to the situation where the system's memory is almost running out. If $Mem_{system,now} > 85\%$ and $R_{system} \geq \mu$, this corresponds to the situation where the system's memory is close to running out and will likely do so within some designated period of time (which may be different than the durations or designated periods of time utilized for evaluating whether a particular application i's average memory usage rate of increase is greater than or equal to either the long-term threshold θ or the short-term threshold φ).

When a memory leak occurs, it is often difficult to perform root cause analysis as it is not known "who" (e.g., which application) and "where" memory is allocated and "who" should be responsible for releasing it. In illustrative embodiments, the applier's (e.g., the application that allocates, de-allocates or re-allocates memory) information is logged, where such information may include a call trace, application ID, time, etc. With such information, a developer or automated system can perform root cause analysis of memory leak issues that are detected using the rule-based anomaly detection techniques described herein.

To log the various information used by the rule-based anomaly detection memory leak analysis tools for detecting memory leaks, a set of memory leak analysis tool "hooks" are designed which trace certain programming commands for allocating, de-allocating and re-allocating memory. In the description below, it is assumed that the memory leak analysis tool hooks include two hooks, a memory allocation operation hook and a memory de-allocation operation hook. The memory allocation operation hook (also referred to as a "malloc hook") tracks memory allocation operations, such as operations that use the C programming language's standard library "malloc" function or "calloc" function. The memory de-allocation operation hook (also referred to as a "free hook") tracks memory de-allocation operations, such as operations that use the C programming languages standard library "free" function. It should be appreciated that, if other programming languages are used, these hooks may track different operations defined in the libraries of such other programming languages which are used for memory allocation and de-allocation operations. Further, in some embodiments additional hooks may be used, such as hooks that track memory re-allocation operations (e.g., operations that use the C programming language's standard library "realloc" function).

The memory allocation operation hook (the malloc hook) is added into the function or functions used for memory allocation in the programming language being utilized. In the description below, it is assumed that the C programming language is used and that this hook is added into the "malloc" function of the C programming language's standard library. This hook may also be added to other functions in the C programming language's standard library (e.g., such as "calloc") or other types of functions if another programming language is utilized. The malloc hook is called before the malloc function, and checks if the caller's (e.g., the application invoking the malloc operation) application ID is in an application_ID list set by the rule-based anomaly detection memory leak analysis tool. If the caller's application ID is in the application_ID list, the call trace, application ID, time, size and other parameters are logged to create an information entry for a tracked memory allocation operation list, also referred to as the memory malloc list.

The memory de-allocation operation hook (the free hook) is added into the function or functions used for memory de-allocation in the programming language being utilized. In the description below, it is assumed that the C programming language is used and that this hook is added into the "free" function of the C programming language's standard library. This hook may also be added to other types of functions if another programming language is utilized. The free hook is called before memory is freed or de-allocated using the free function. When a memory is freed, the free hook will check if there is an associated information entry in the tracked memory allocation operation list. If so, that information entry is removed from the tracked memory allocation operation list. FIG. 3 illustrates pseudocode 300 for implementing the memory allocation and de-allocation operation hooks (e.g., the malloc and free hooks).

The rule-based anomaly detection memory leak analysis tool is further configured with various functions, including an initialize function, a de-initialize function, and an analyze function. The memory leak analysis tool initialize function enables the memory allocation operation and memory de-allocation operation hooks (e.g., the malloc hook and the free hook) on-the-fly or on demand for a system as a whole, or for individual applications running on the system. The memory leak analysis tool initialize function may be invoked in response to an explicit request by an end-user or system administrator, or in response to some designated event (e.g., determining that an application is suspected to have a memory leak, determining that system performance is becoming degraded, etc.). The memory leak analysis tool de-initialize function disables the memory allocation operation and memory de-allocation operation hooks (e.g., the malloc hook and the free hook) on-the-fly or on demand for the system as a whole, or for individual applications running on the system. In some embodiments, the memory leak analysis tool de-initialize function is invoked in response to an explicit request by an end-user or system administrator, or in response to some designated event (e.g., determining that the memory leak analysis tool has been running for some defined duration, determining that the root cause of a memory leak has been discovered and/or fixed, determining that system performance is not or is no longer degraded, etc.).

The memory leak analysis tool initialize and de-initialize functions may also be invoked in accordance with some specified schedule. For example, an end-user or system administrator may specify that rule-based anomaly detection for memory leaks is performed for a system only at specific times of the day or for specific days. As another example, the end-user or system administrator may specify that the rule-based anomaly detection for memory leaks should be performed for different subsets of the applications running on a system at different times or different days. Various other examples are possible.

The memory leak analysis tool analyze function may be called after the memory leak analysis tool is disabled (e.g., after the memory leak analysis tool de-initialize function is called for the system as a whole or for one or more applications running thereon) or some designated period of time after the memory leak analysis tool has been enabled (e.g., a designated period of time after the memory leak analysis tool initialize function was called for the system as a whole or for one or more applications running thereon). The memory leak analysis tool analyze function will analyze any remaining entries in the tracked memory allocation operation list, as such remaining entries correspond to memory which has been allocated but not de-allocated and thus may be part of a memory leak. The remaining entries in the tracked memory allocation operation list may be listed or sorted in accordance with their frequency (e.g., of the associated application ID), where a higher frequency corresponds to a high probability of being a memory leak. A developer or automated system can analyze such information to determine whether any of the suspected memory leaks are an actual memory leaks, and perform any required root cause analysis to remedy such actual memory leaks. In some embodiments, on detecting an actual or suspected memory leak, various remedial actions may be initiated. Such remedial actions may include, but are not limited to, killing or ending the application associated with the suspected or actual memory leak, increasing an amount of system memory (e.g., such as through the addition of physical or virtual memory resources to the system), generation of notifications to end-users or system administrators (e.g., where the notification may indicate the application associated with a suspected or actual memory leak and which gives the end-users or system administrators the option to perform other remedial actions such as killing or ending the application), etc.

Figure 4:
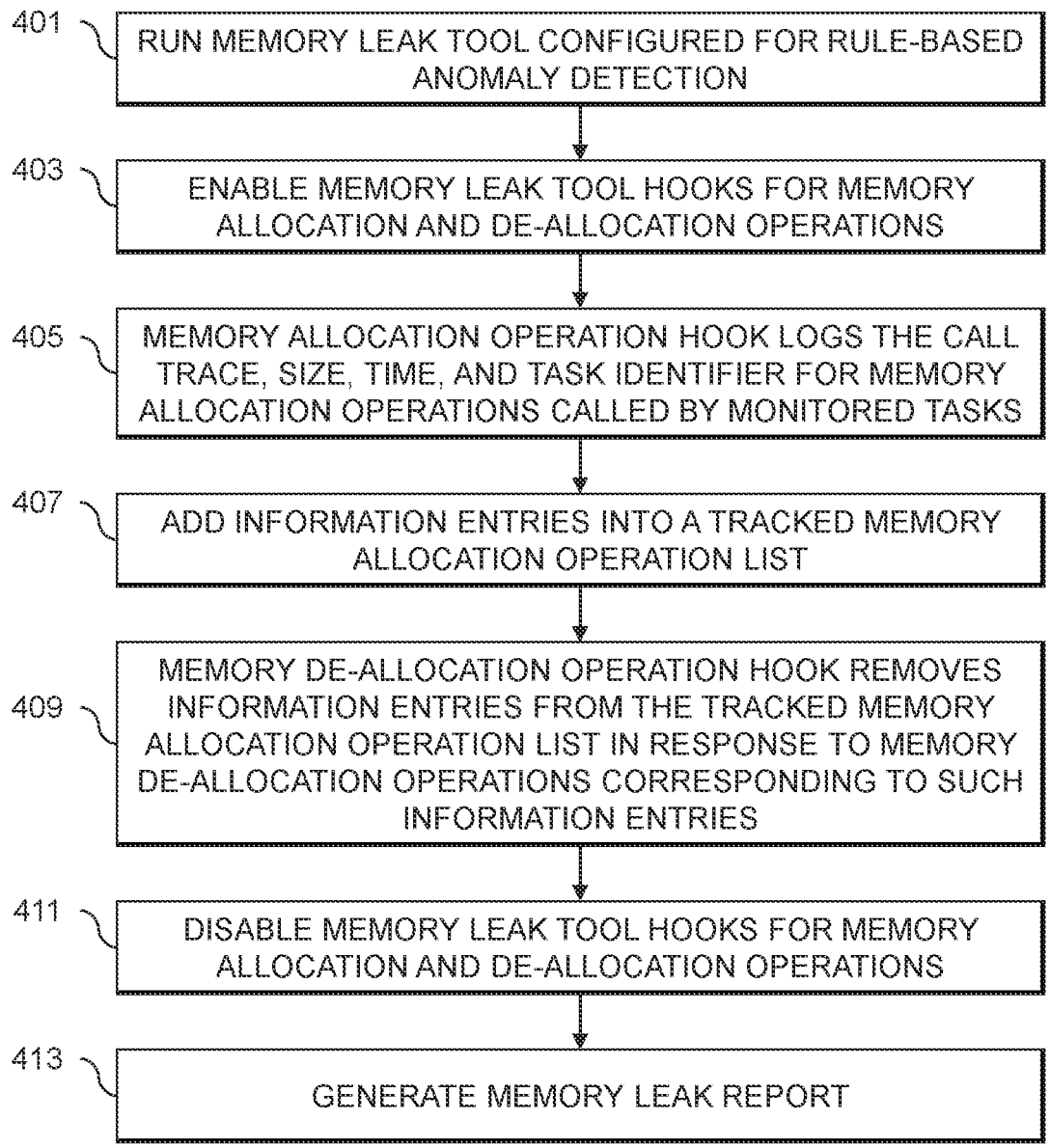
FIG. 4 shows a workflow for performing rule-based anomaly detection of memory leaks in an illustrative embodiment.

FIG. 4 shows a process flow for utilizing a memory leak analysis tool. In step 401, the memory leak analysis tool, which is configured for rule-based anomaly detection, is run on a system. The memory leak analysis tool may be run as a background job (or, more generally a background application) on the system. In response to a designated event, the memory leak analysis tool initialize function is invoked to enable the memory leak analysis tool hooks for memory allocation and de-allocation operations (e.g., the malloc and free hooks) in step 403. Step 403 may be performed for the system as a whole, or for individual applications running on the system. For example, the designated event which triggers step 403 may be determining that there is a given application which is suspected as having a memory leak. The designated event which triggers step 403 may alternatively be determining that overall system performance has become degraded. Step 403 may also or alternatively be triggered by an end-user or system administrator request, according to some schedule, etc.

In step 405, the memory allocation operation hook (e.g., the malloc hook) begins to track memory allocation operations (e.g., for the system as a whole, for specified applications running on the system based on whether their associated application IDs are in an application_ID list). When a memory allocation operation is called by an application having an application ID in the application_ID list, an information entry is created which includes various information, such as a call trace, time, size, application ID, etc. The information entry is added to the tracked memory allocation operation list in step 407. The memory de-allocation operation hook (e.g., the free hook) in step 409 removes information entries from the tracked memory allocation operation list in response to memory de-allocation operations corresponding to such information entries.

Steps 405 through 409 are run until the memory leak analysis tool de-initialize function is invoked in step 411, which disables the memory allocation and de-allocation operation hooks (e.g., the malloc and free hooks). Step 411 may be performed in response to some designated event, and similar to step 403 may be performed for the system as a whole, or for individual applications running on the system. The designated event, in some embodiments, is expiration of a designated duration of time since step 403 was performed. The designated event may also or alternatively include determining that overall system performance is not (or is no longer) degraded. Step 411 may also or alternatively be triggered by an end-user or system administrator request, according to some schedule, etc. In step 413, a memory leak report is generated by analyzing information entries remaining in the tracked memory allocation operation list. The information entries may be ranked or sorted by call trace appearance frequency (or by some other parameter, such as application ID). The bigger the frequency, the more likely that the information entries correspond to a suspected memory leak. The memory leak report may be used to take various remedial actions (e.g., performing root cause analysis, killing or ending applications that are associated with suspected or actual memory leaks, generating and delivering notifications to end-users or system administrators, etc.).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for identification and remediation of memory leaks using rule-based detection of anomalous memory usage patterns will now be described in greater detail with reference to FIGS. 5 and 6. Although described in the context of system 100, these platforms may also be used to implement at least portions of other information processing systems in other embodiments.

Figure 5:
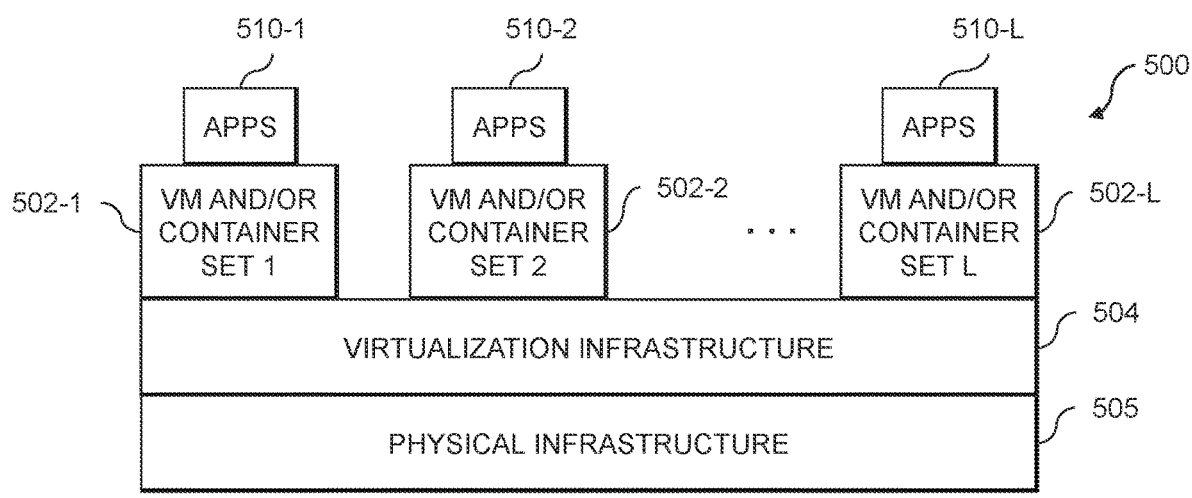
FIGS. 5 and 6 show examples of processing platforms that may be utilized to implement at least a portion of an information processing system in illustrative embodiments.
Figure 6:
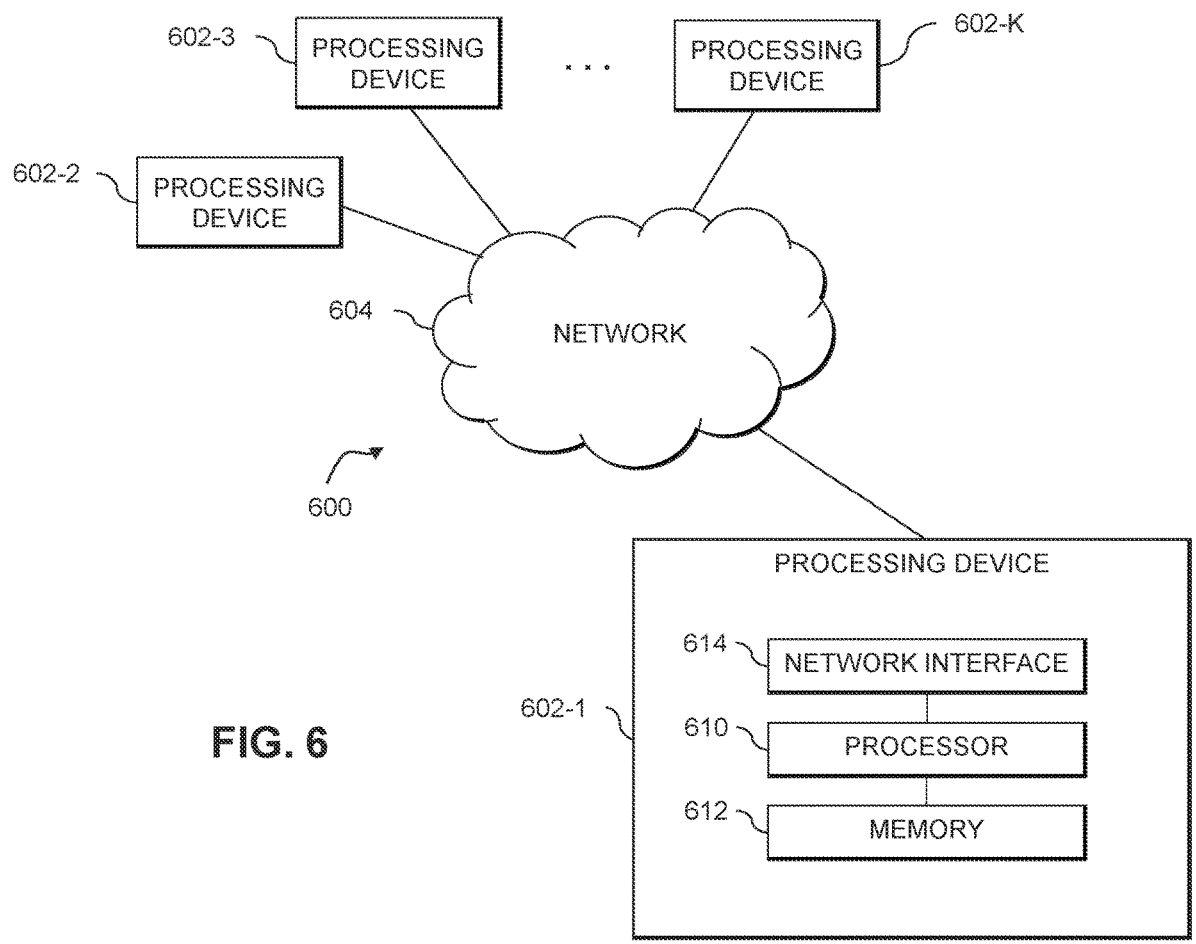

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for identification and remediation of memory leaks using rule-based detection of anomalous memory usage patterns as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, anomalous memory usage patterns, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;

the at least one processing device being configured to perform steps of:

initiating, in response to a designated event, monitoring of memory allocation and de-allocation operations associated with at least a given one of a set of applications;

maintaining a memory allocation operation data structure comprising one or more entries, each of the one or more entries corresponding to a monitored memory allocation operation associated with the given application not having an associated memory de-allocation operation;

determining whether memory usage of the given application corresponds to any of a set of anomalous memory usage patterns based at least in part on the one or more entries of the memory allocation operation data structure for the given application, wherein the set of anomalous memory usage patterns comprises at least one memory usage pattern where memory usage by the given application increases by at least a designated usage threshold while application load of the given application increases by less than a designated load threshold; and identifying the given application as having at least a designated threshold likelihood of being a cause of at least one memory leak responsive to determining that the memory usage of the given application corresponds to one or more of the set of anomalous memory usage patterns; and performing one or more remedial actions for at least one of preventing and resolving said at least one memory leak responsive to identifying the given application as having at least the designated threshold likelihood of being the cause of said at least one memory leak.

2. The apparatus of claim 1 wherein the designated event comprises at least one of:

receiving a request to determine whether the given application is a cause of said at least one memory leak;

determining that a system on which the given application runs is experiencing said at least one memory leak; and determining that a system on which the given application runs is experiencing degraded performance, the degraded performance corresponding to one or more performance metrics being below one or more designated performance metric thresholds for at least a designated threshold period of time.

3. The apparatus of claim 1 wherein monitoring memory allocation and de-allocation operations associated with the given application comprises activating application hooks in memory allocation and de-allocation functions exposed by a system on which the given application runs.

4. The apparatus of claim 1 wherein maintaining the memory allocation operation data structure comprises:

creating an entry in the memory allocation operation data structure in response to each detected memory allocation operation associated with the given application; and removing an entry in the memory allocation operation data structure in response to each detected memory de-allocation operation.

5. The apparatus of claim 1 wherein a given one of the entries in the memory allocation operation data structure comprises an identifier of the given application, a time of a given memory allocation request by the given application, an identification of a given portion of memory of a system on which the given application runs that is allocated to the given application in response to the given memory allocation request, and a size of the given portion of the memory of the system on which the given application runs that is allocated to the given application in response to the given memory allocation request.

6. The apparatus of claim 5 wherein the given memory allocation request comprises at least one of:

a call to a memory allocation function that dynamically assigns a block of memory with a specified size;

a call to a contiguous memory allocation function that dynamically assign two or more blocks of memory with specified sizes; and a call to a memory re-allocation function that dynamically changes the allocation of at least one previously-assigned block of memory.

7. The apparatus of claim 1 wherein determining whether the memory usage of the given application corresponds to any of the set of anomalous memory usage patterns is performed in response to an additional designated event, and wherein the additional designated event comprises at least one of:

receiving a request to cease monitoring of the memory allocation and de-allocation operations associated with the given application;

determining that the memory allocation and de-allocation operations associated with the given application have been monitored for at least a designated threshold period of time;

determining that a system on which the given application runs is no longer experiencing said at least one memory leak; and determining that the system on which the given application runs is no longer experiencing degraded performance, wherein determining that the system is no longer experiencing degraded performance is based at least in part on one or more performance metrics being at or above one or more designated performance metric thresholds for at least a designated threshold period of time.

8. The apparatus of claim 1 wherein the set of anomalous memory usage patterns comprise:

a first memory usage pattern where memory usage of the given application increases over a first designated period of time; and a second memory usage pattern where memory usage of the given application increases over a second designated period of time while application load of the given application increase less than the designated load threshold.

9. The apparatus of claim 8 wherein the first designated period of time is longer than the second designated period of time.

10. The apparatus of claim 1 wherein the set of anomalous memory usage patterns comprises:

a first memory usage pattern where available memory of a system on which the given application runs is below a first designated available memory threshold; and a second memory usage pattern where the available memory of the system on which the given application runs is below a second designated available memory threshold and a rate of increase in memory usage of the system on which the given application runs is above a designated memory usage increase rate threshold, wherein the second designated available memory threshold is lower than the first designated available memory threshold.

11. The apparatus of claim 1 wherein at least one of the one or more remedial actions for at least one of preventing and resolving said at least one memory leak comprises stopping execution of the given application.

12. The apparatus of claim 1 wherein at least one of the one or more remedial actions for at least one of preventing and resolving said at least one memory leak comprises modifying allocation of at least one of physical and virtual memory resources to a system on which the given application runs.

13. The apparatus of claim 1 wherein at least one of the one or more remedial actions for at least one of preventing and resolving said at least one memory leak comprises initiating performance of root cause analysis for said at least one memory leak.

14. The apparatus of claim 1 wherein at least one of the one or more remedial actions for at least one of preventing and resolving said at least one memory leak comprises generating and delivering a notification to one or more information technology administrators responsible for managing a system on which the given application runs.

15. A computer program product comprising a non-transitory processor-readable storage medium having stored therein program code of one or more software programs, wherein the program code when executed by at least one processing device causes the at least one processing device to perform steps of:
    initiating, in response to a designated event, monitoring of memory allocation and de-allocation operations associated with at least a given one of a set of applications;
    maintaining a memory allocation operation data structure comprising one or more entries, each of the one or more entries corresponding to a monitored memory allocation operation associated with the given application not having an associated memory de-allocation operation;
    determining whether memory usage of the given application corresponds to any of a set of anomalous memory usage patterns based at least in part on the one or more entries of the memory allocation operation data structure for the given application, wherein the set of anomalous memory usage patterns comprises at least one memory usage pattern where memory usage by the given application increases by at least a designated usage threshold while application load of the given application increases by less than a designated load threshold; and
    identifying the given application as having at least a designated threshold likelihood of being a cause of at least one memory leak responsive to determining that the memory usage of the given application corresponds to one or more of the set of anomalous memory usage patterns; and
    performing one or more remedial actions for at least one of preventing and resolving said at least one memory leak responsive to identifying the given application as having at least the designated threshold likelihood of being the cause of said at least one memory leak.

16. The computer program product of claim 15 wherein monitoring memory allocation and de-allocation operations associated with the given application comprises activating application hooks in memory allocation and de-allocation functions exposed by a system on which the given application runs.

17. The computer program product of claim 15 wherein a given one of the entries in the memory allocation operation data structure comprises an identifier of the given application, a time of a given memory allocation request by the given application, an identification of a given portion of memory of a system on which the given application runs that is allocated to the given application in response to the given memory allocation request, and a size of the given portion of the memory of the system on which the given application runs that is allocated to the given application in response to the given memory allocation request.

18. A method comprising:
    initiating, in response to a designated event, monitoring of memory allocation and de-allocation operations associated with at least a given one of a set of applications;
    maintaining a memory allocation operation data structure comprising one or more entries, each of the one or more entries corresponding to a monitored memory allocation operation associated with the given application not having an associated memory de-allocation operation;
    determining whether memory usage of the given application corresponds to any of a set of anomalous memory usage patterns based at least in part on the one or more entries of the memory allocation operation data structure for the given application, wherein the set of anomalous memory usage patterns comprises at least one memory usage pattern where memory usage by the given application increases by at least a designated usage threshold while application load of the given application increases by less than a designated load threshold; and
    identifying the given application as having at least a designated threshold likelihood of being a cause of at least one memory leak responsive to determining that the memory usage of the given application corresponds to one or more of the set of anomalous memory usage patterns; and
    performing one or more remedial actions for at least one of preventing and resolving said at least one memory leak responsive to identifying the given application as having at least the designated threshold likelihood of being the cause of said at least one memory leak;
    wherein the method is performed by at least one processing device comprising a processor coupled to a memory.

19. The method of claim 18 wherein monitoring memory allocation and de-allocation operations associated with the given application comprises activating application hooks in memory allocation and de-allocation functions exposed by a system on which the given application runs.

20. The method of claim 18 wherein a given one of the entries in the memory allocation operation data structure comprises an identifier of the given application, a time of a given memory allocation request by the given application, an identification of a given portion of memory of a system on which the given application runs that is allocated to the given application in response to the given memory allocation request, and a size of the given portion of the memory of the system on which the given application runs that is allocated to the given application in response to the given memory allocation request.

* * * * *